Dec. 27, 1966   L. G. SIMJIAN   3,295,139
DEPOSITORY MACHINE
Filed Oct. 9, 1963   11 Sheets-Sheet 1
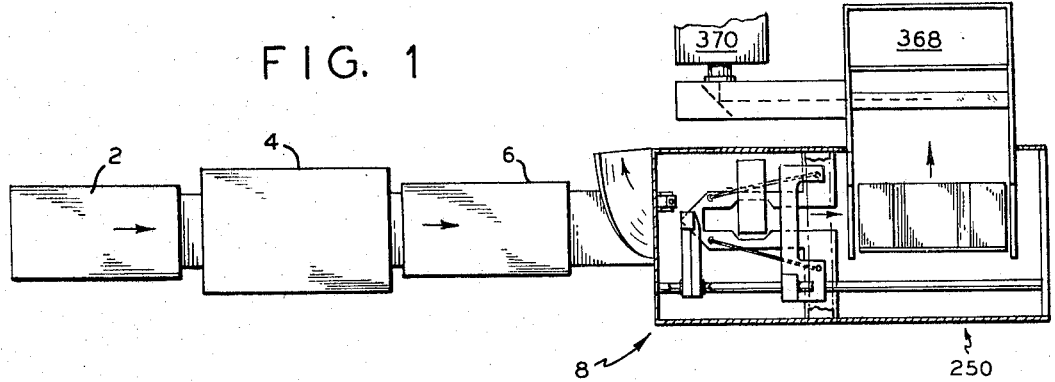
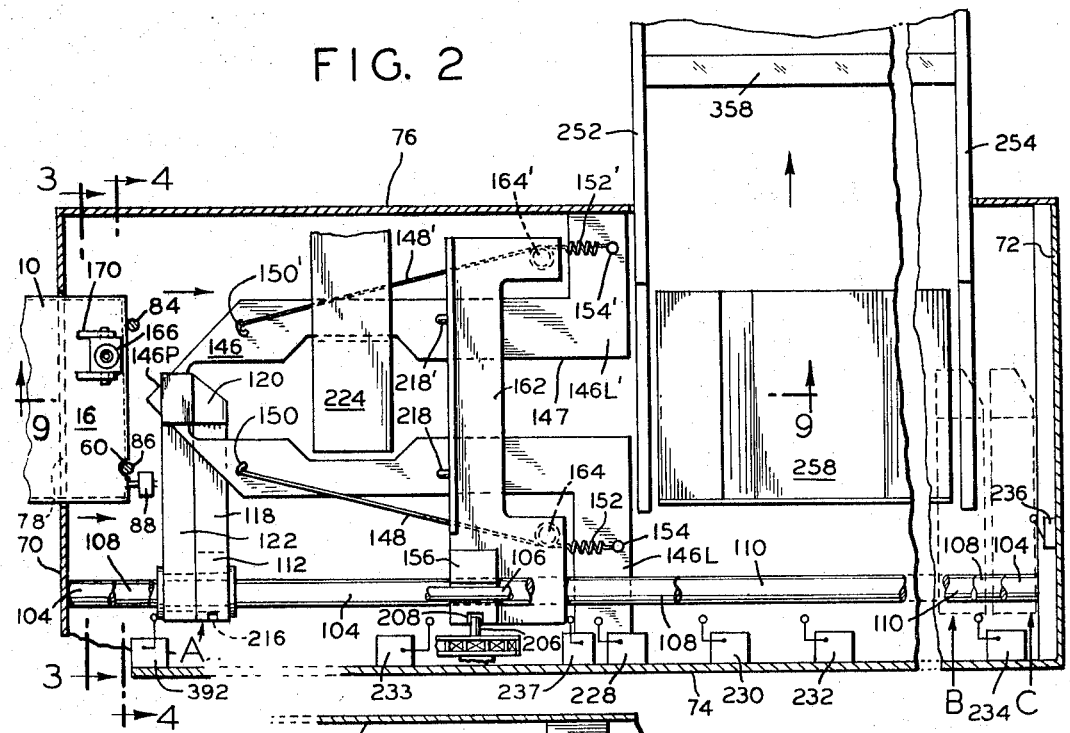
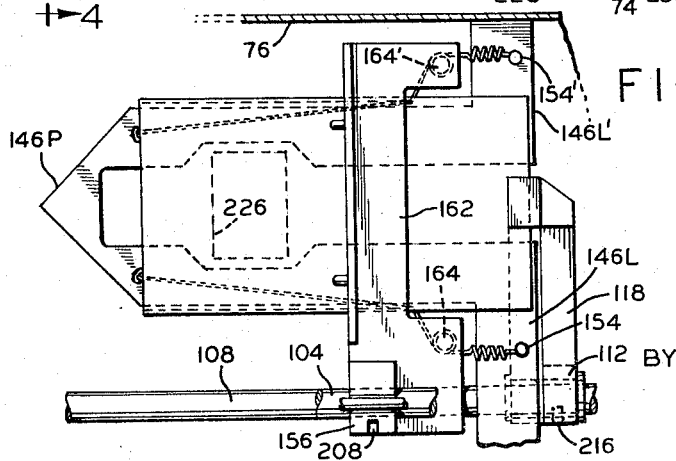
LUTHER G. SIMJIAN
INVENTOR
BY
ATTORNEY
AGENT Dec. 27, 1966  L. G. SIMJIAN  3,295,139
DEPOSITORY MACHINE
Filed Oct. 9, 1963  11 Sheets-Sheet 2
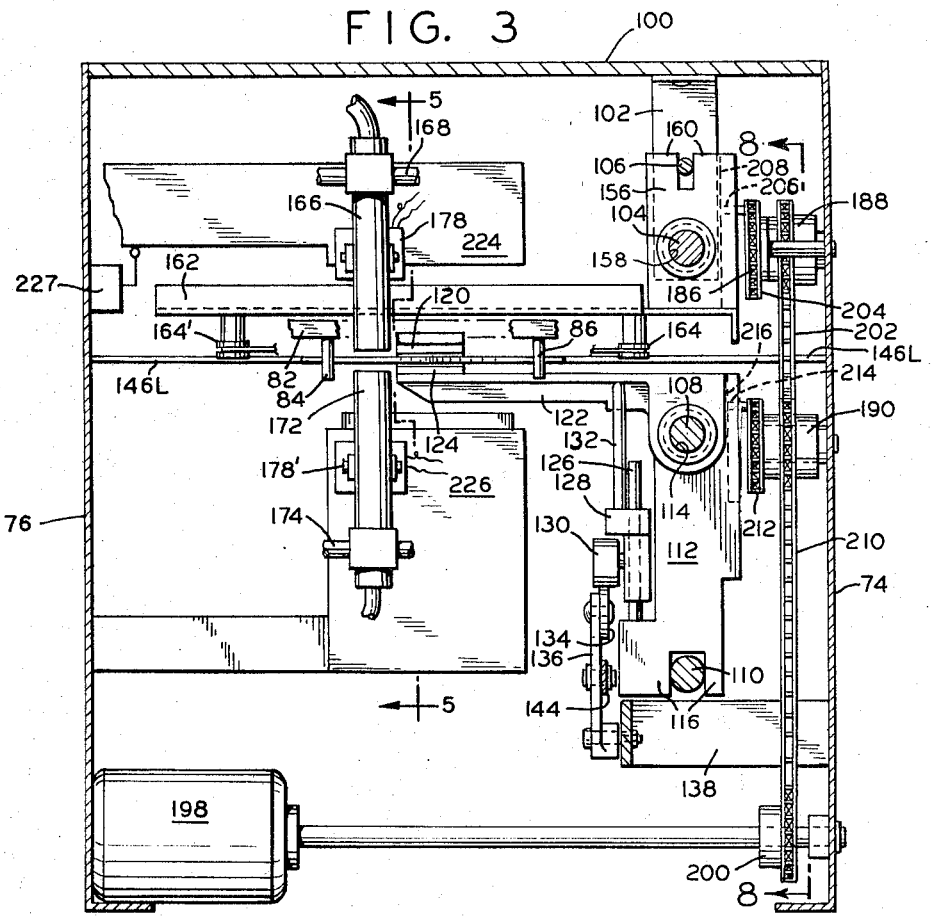
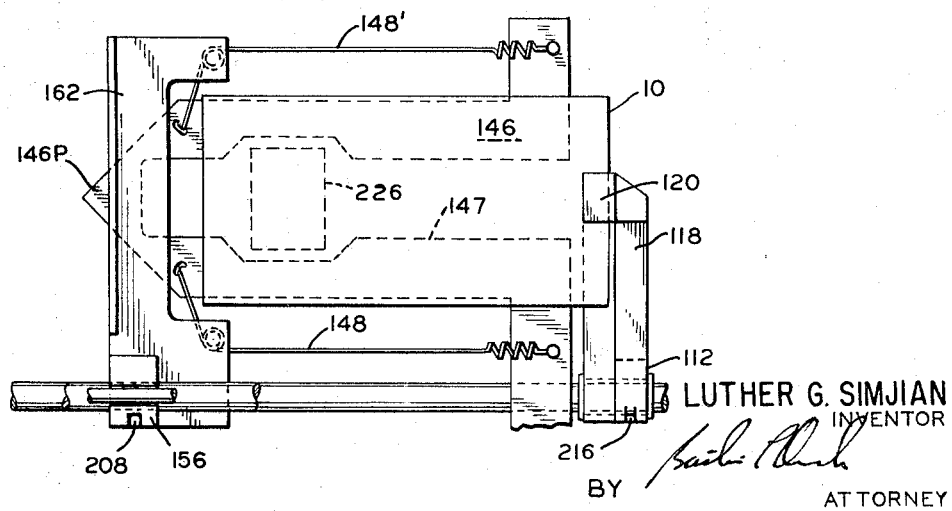
LUTHER G. SIMJIAN
INVENTOR
BY
ATTORNEY
AGENT Dec. 27, 1966 L. G. SIMJIAN 3,295,139
DEPOSITORY MACHINE
Filed Oct. 9, 1963 11 Sheets-Sheet 5
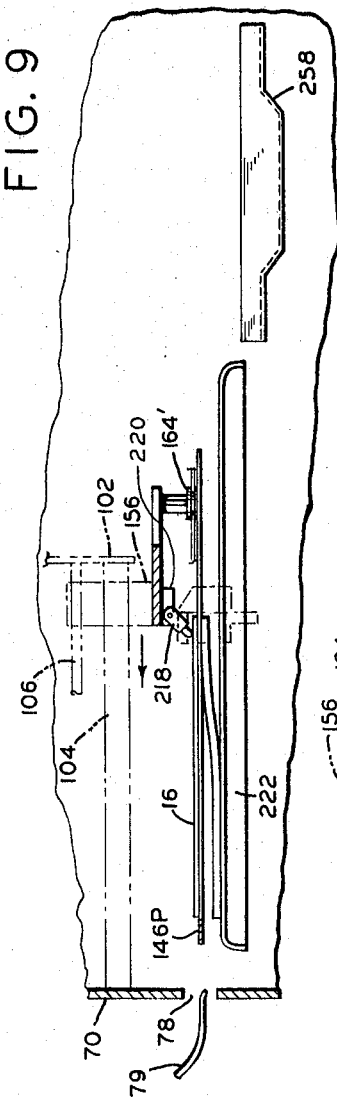
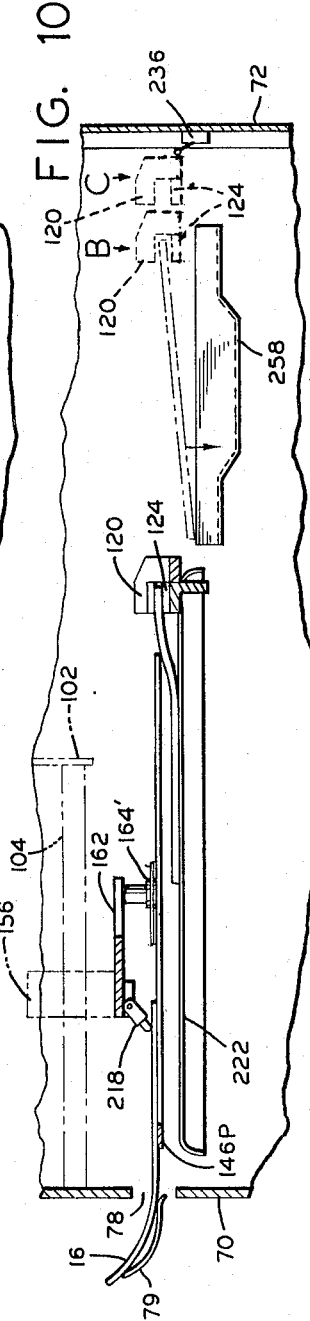
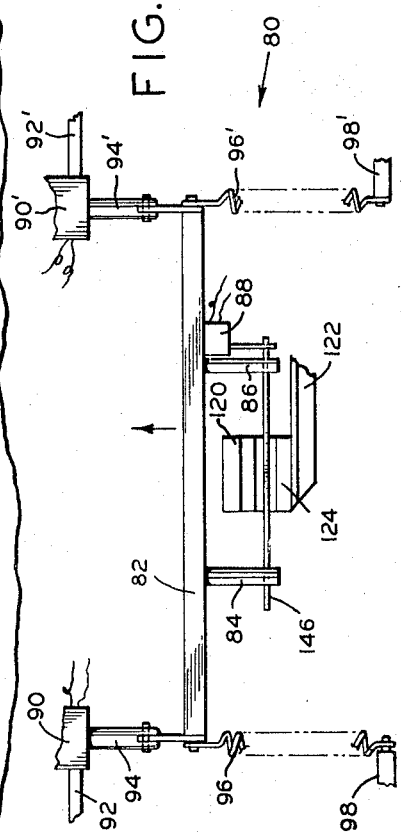
LUTHER G. SIMJIAN
INVENTOR
BY
ATTORNEY
AGENT Dec. 27, 1966   L. G. SIMJIAN   3,295,139
DEPOSITORY MACHINE
Filed Oct. 9, 1963   11 Sheets-Sheet 4
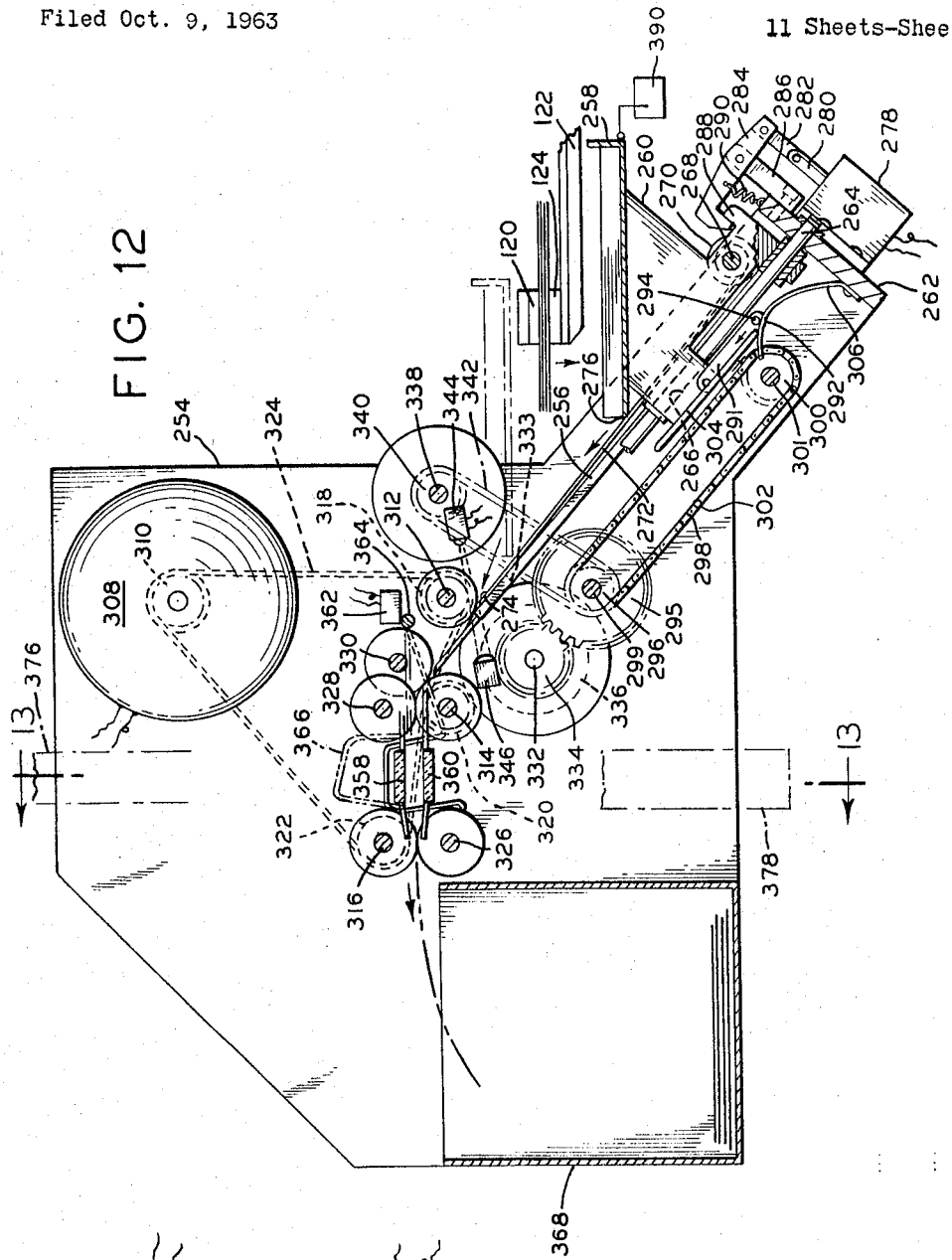
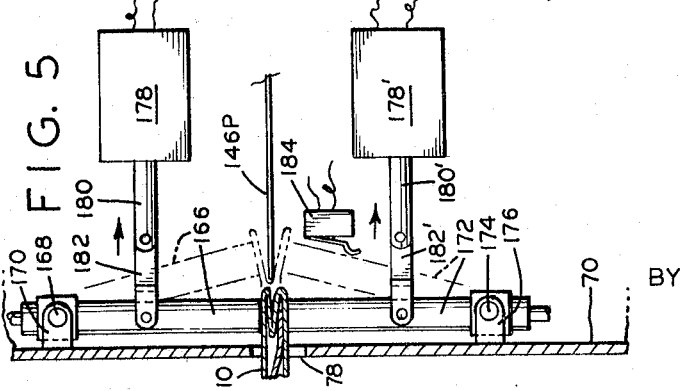
LUTHER G. SIMJIAN
INVENTOR
BY
ATTORNEY
AGENT

LUTHER G. SIMJIAN
INVENTOR

Dec. 27, 1966 L. G. SIMJIAN 3,295,139
DEPOSITORY MACHINE
Filed Oct. 9, 1963 11 Sheets-Sheet 6
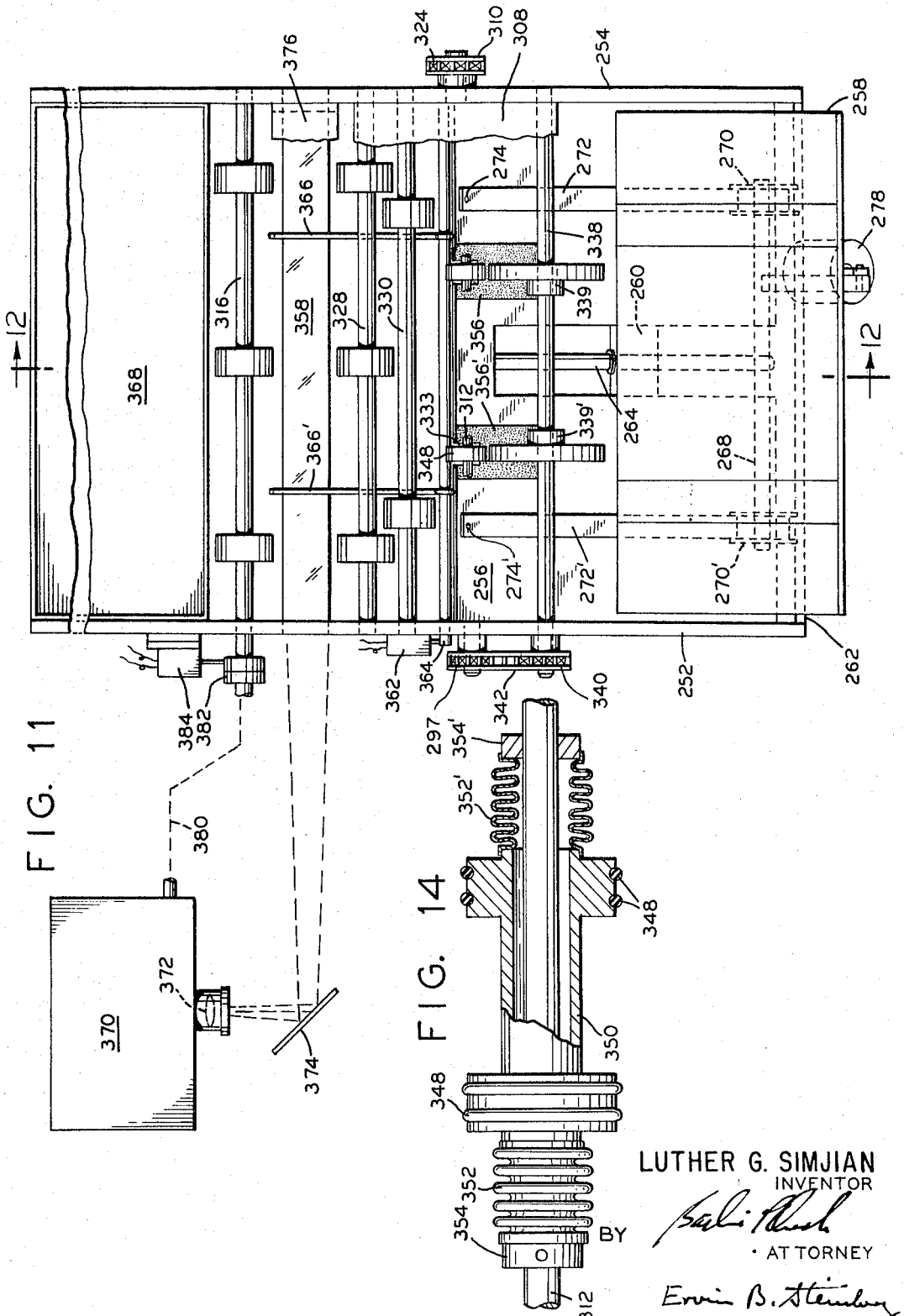
LUTHER G. SIMJIAN
INVENTOR
BY
ATTORNEY
AGENT Dec. 27, 1966  L. G. SIMJIAN  3,295,139
DEPOSITORY MACHINE Filed Oct. 9, 1963  11 Sheets-Sheet 7

LUTHER G. SIMJIAN
INVENTOR

BY
ATTORNEY

Erwin B. Steinberg
AGENT

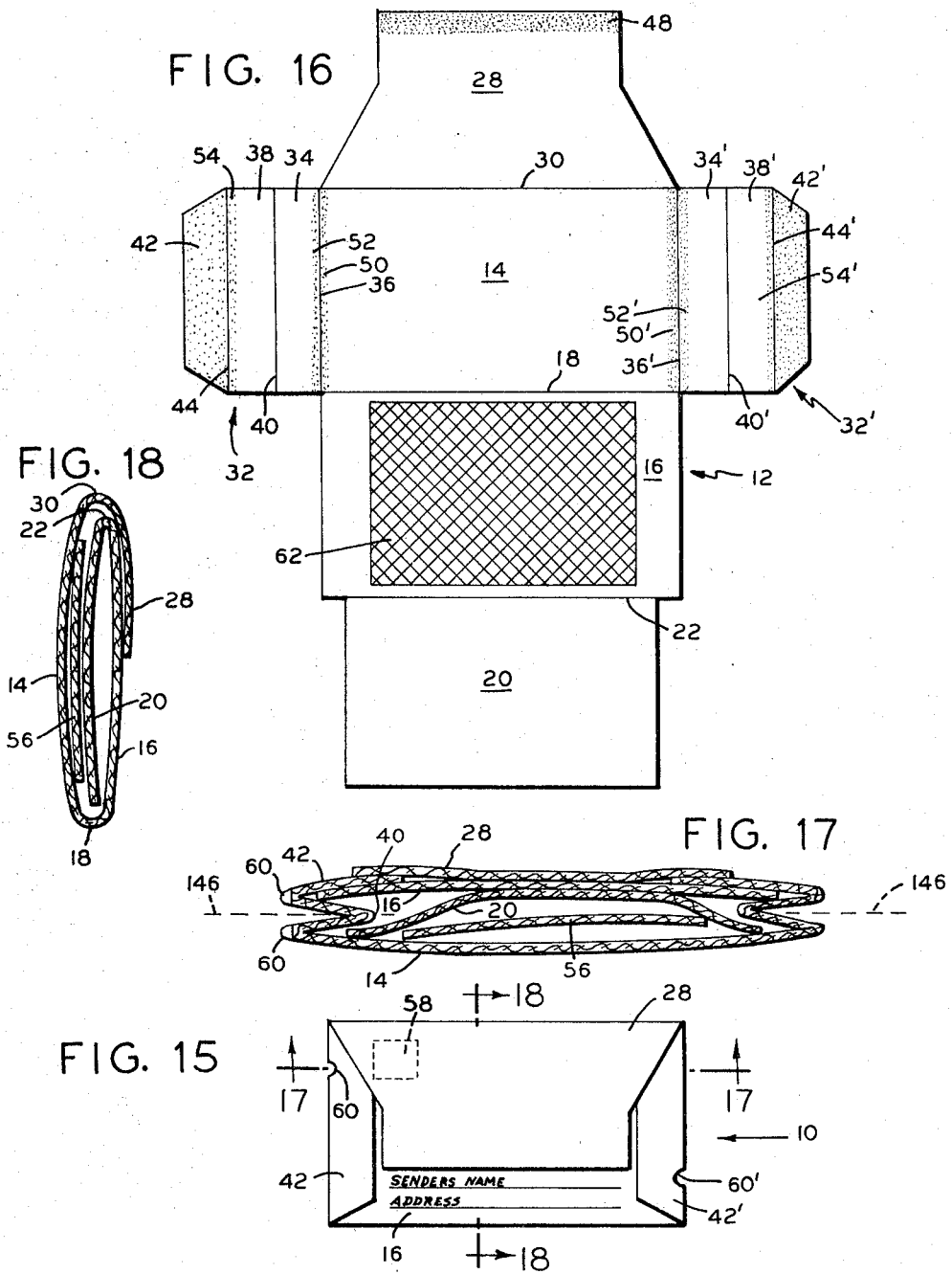

Dec. 27, 1966   L. G. SIMJIAN   3,295,139
DEPOSITORY MACHINE

Filed Oct. 9, 1963   11 Sheets-Sheet 11

LUTHER G. SIMJIAN
INVENTOR

BY
ATTORNEY

Ervin B. Steinberg
AGENT

United States Patent Office 3,295,139
Patented Dec. 27, 1966

3,295,139
DEPOSITORY MACHINE
Luther G. Simjian, Greenwich, Conn., assignor to Universal Match Corporation, St. Louis, Mo., a corporation of Delaware
Filed Oct. 9, 1963, Ser. No. 315,016
17 Claims. (Cl. 346—22)

This invention relates to depository machines and more particularly to a depository machine combined with an image recording means which is suitable for receiving deposits in a bank or a similar establishment.

In U.S. Patent No. 3,076,965, granted to me on February 5, 1963, entitled, "Depository Machine Combined With Image Recording Means," there is disclosed a machine which is adapted to receive an envelope containing a plurality of documents, such as paper currency and checks, to extract the paper currency and checks from the envelope, to individually photograph and to store the paper currency and checks, and to provide a receipt for the transaction.

In U.S. Patents No. 3,187,985 and 3,187,986 both dated June 8, 1965 and entitled "Envelope," there are disclosed envelopes which are adapted to receive and to transport documents; each is adapted to be automatically opened by a suitable machine and the documents separated therefrom without the possibility of damage to the documents; and each automatically creates a transaction receipt which may be separated with the documents from the envelope.

The machine of this invention is especially suited for use with the double ended envelope disclosed in U.S. Patent No. 3,187,986 supra. The depositor may at his convenience insert into the envelope the paper currency and checks which he intends to deposit and seal the envelope. This envelope may then later be personally inserted into the machine by the depositor; or it may be sent through the mails to the bank, whereat the envelope, without first being opened, is inserted into the machine.

An object of this invention, therefore, is to provide a machine for receiving a sealed envelope containing a plurality of documents, for extracting the documents from the envelope, for serially making a record of each extracted document, and for reforming the recorded document in a stack, each plurality of documents being separated from adjacent other pluralities of documents by the envelope.

Another object is to provide a machine for receiving a sealed envelope from a depositor, either directly or via the mails, for automatically opening the envelope and extracting the contents, for making a record of the contents, and for returning a receipt of the transaction.

A feature of this invention is the provision of means for receiving a plurality of sealed envelopes, each containing at least a document; means for dividing each envelope into at least two independent portions; means for extracting the contained documents from each envelope; means for serially recording each extracted document; and means for disposing the recorded documents in a stack, the documents from one envelope being separated from adjacent other documents by at least one portion of the one envelope.

The operation of the overall system may be briefly summarized as follows:

(1) An envelope having a multifold plait at one end is received in a random orientation, inspected for an indicium, oriented with respect to the indicium and the system, and stored in a buffer storage.

(2) The envelope is fed to an opening system, the orientation of the multifold plait is ascertained by a gate assembly, and if correct, the opening process is initiated. A pair of suction tubes seizes the upper and lower panels of the envelope, spreading apart the multifold plait, and advances the plait onto a dagger-like assembly. The envelope is then seized by a pair of clamp elements which advances the envelope on the dagger-like assembly, causing the assembly to enter the envelope through the plait between the panels. The assembly is manipulated to divide apart the panels. One panel is stamped with a transaction number and this panel is ejected from the system as a receipt.

(3) The divided envelope and its contents are moved as a stack to a recording system. The items of the stack are fed one at a time past the field of view of a camera and both sides of each item are photographed. The items are restacked with the documents from one envelope separated from other documents by portions of that envelope.

These and other objects and features of this invention will become more apparent by reference to the following description taken in conjunction with the accompanying drawings, in which:

FIGURE 1 is a plan view of the overall envelope receiving, opening and recording assemblies;

FIGURE 2 is a plan view of the envelope opening assembly as a detail of FIGURE 1 showing an envelope presented to the opening means;

FIGURE 3 is a side view in cross-section taken along the line 3—3 of FIGURE 2 of the envelope opening assembly;

FIGURE 4 is a side view in cross-section taken along the line 4—4 of FIGURE 2 of the envelope opening assembly, showing as a detail the means for aligning the leading edge of the envelope with the envelope opening means;

FIGURE 5 is a front view in cross-section taken along the line 5—5 of FIGURE 3 of the envelope opening assembly, showing as a detail the means for spreading apart the two folds of the envelope;

FIGURE 6 is a plan view of the envelope opening assembly as a detail of FIGURE 2 showing the envelope partly opened by the opening means;

FIGURE 7 is a plan view of the envelope opening assembly as a detail of FIGURE 2 showing the envelope fully opened by the opening means;

FIGURE 9 is a front view in cross-section taken along the line 9—9 of FIGURE 2 of the envelope opening assembly, showing as a detail the means for returning a portion of the opened envelope as a receipt;

FIGURE 10 is a front view similar to FIGURE 9 showing the ejection of the receipt;

FIGURE 11 is a plan view of the recording assembly;

FIGURE 12 is a side view in cross-section taken along the line 12—12 of FIGURE 11 showing the recording assembly;

FIGURE 14 is a detail of the recording assembly showing a resilient power roller assembly;

FIGURE 15 is a plan view of a double ended envelope which is particularly suitable for use with the instant invention, and which is disclosed in U.S. Patent No. 3,187,986 supra;

FIGURE 16 is a plan view of the paper blank which is folded and glued to form the envelope of FIGURE 15;

FIGURE 17 is a view in cross-section taken along the line 17—17 of FIGURE 15;

FIGURE 18 is a view in cross-section taken along the line 18—18 of FIGURE 15;

Figure 19A:
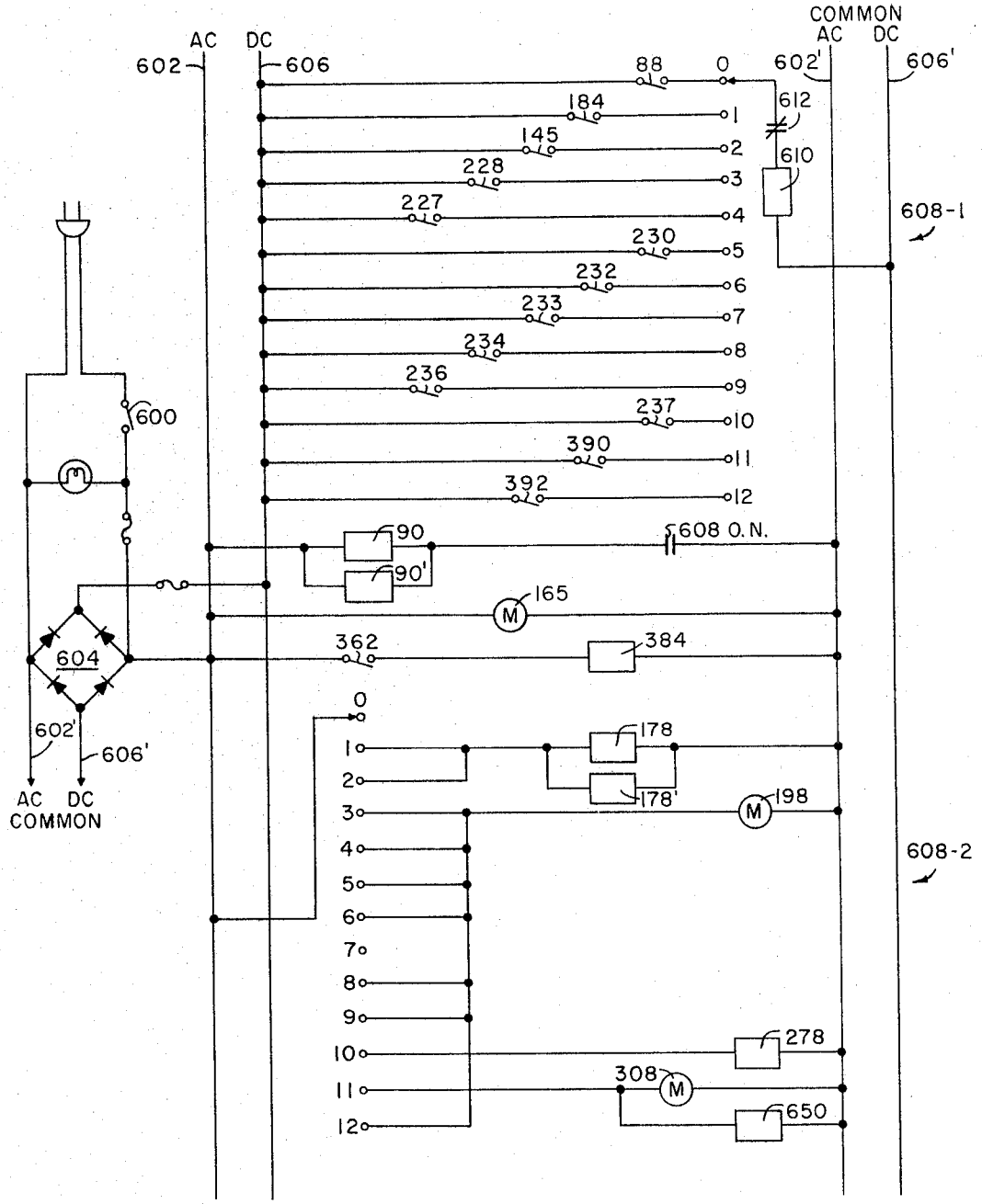
Figure 19B:
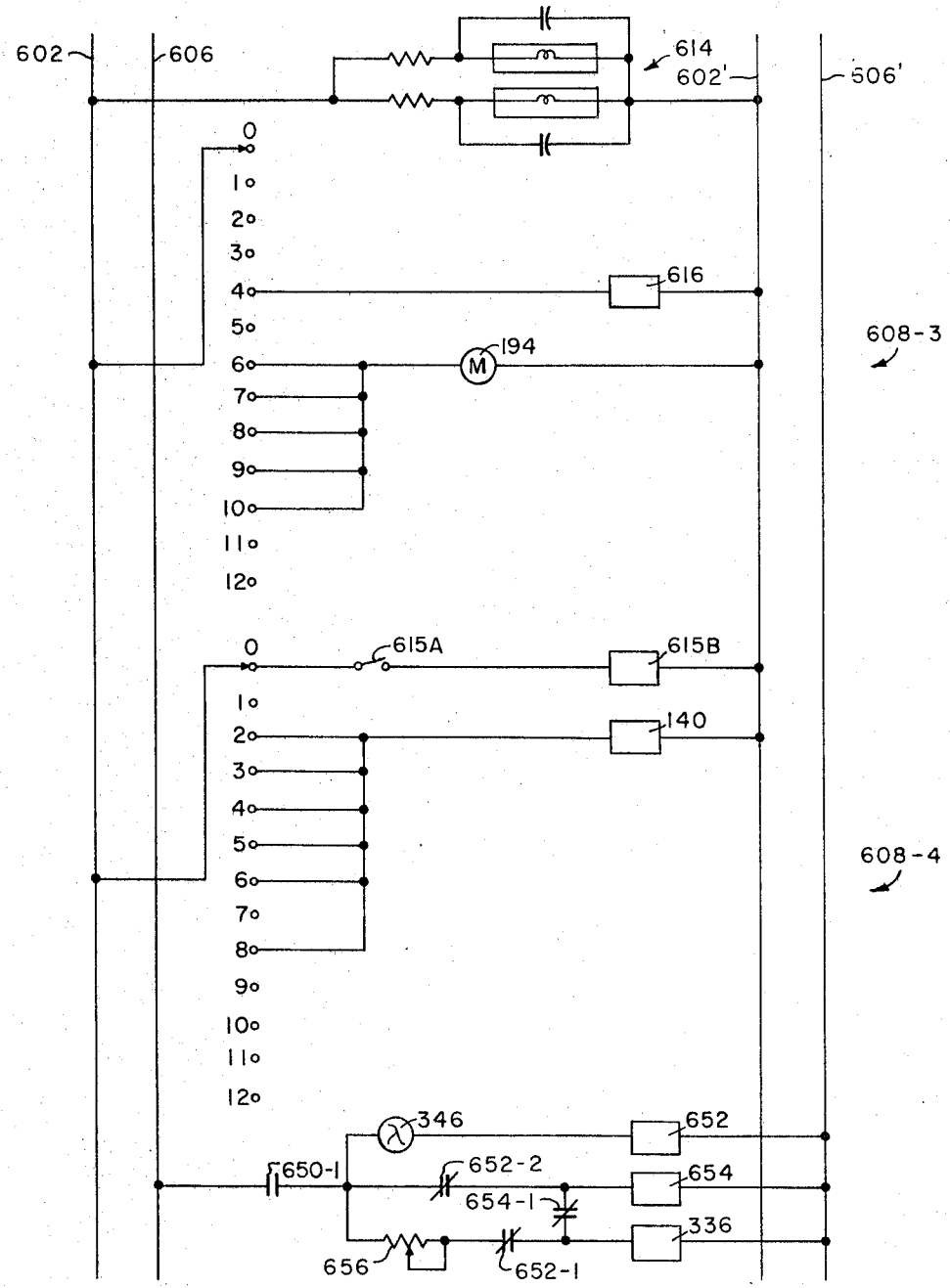
Figures 20, 21:
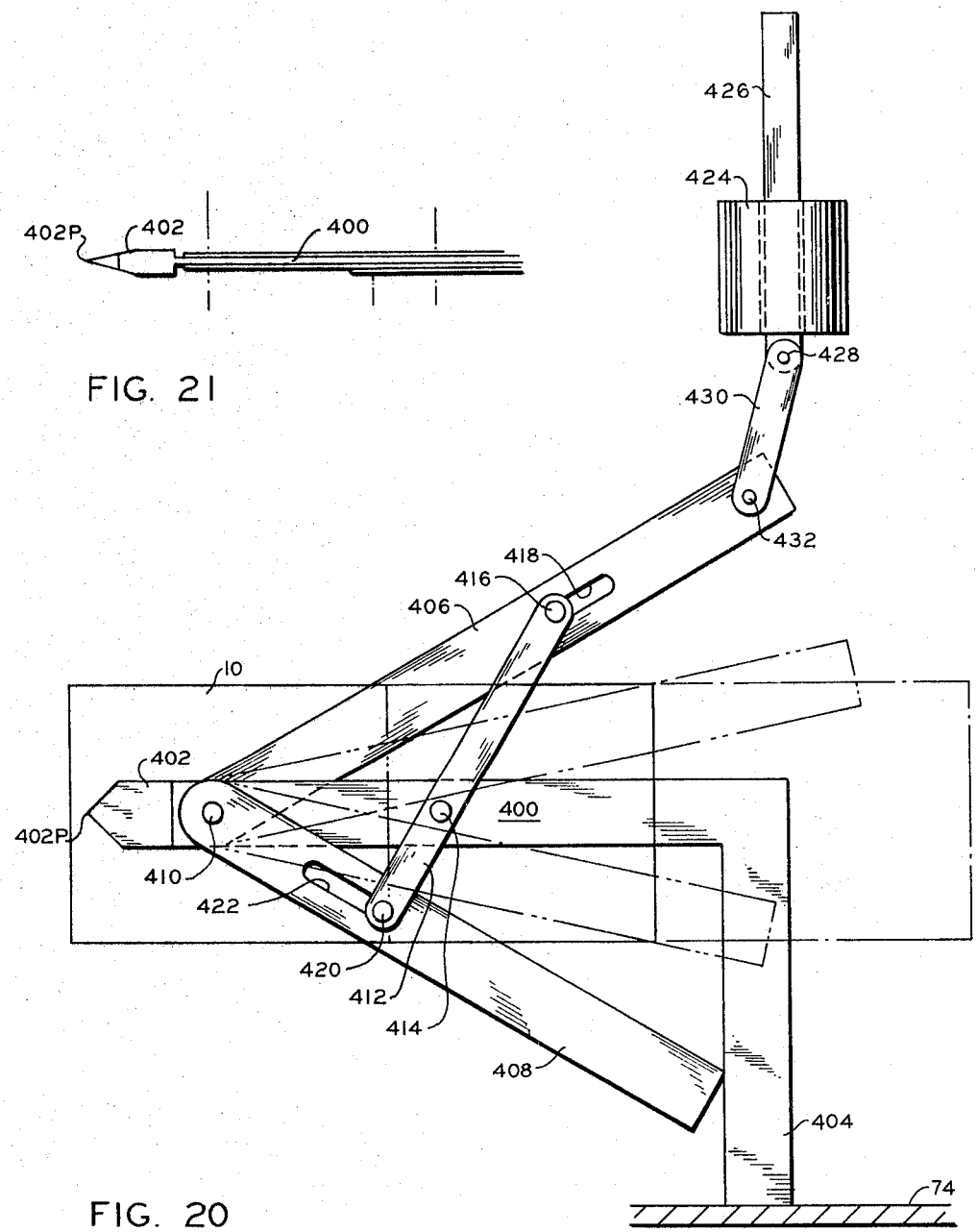

FIGURES 19A and 19B when joined together are a schematic electrical circuit diagram showing the electrical interconnections of the instant invention;

FIGURE 20 is a plan view as a detail of a modification of the envelope opening means; and FIGURE 21 is a front view as a detail of the modification of FIGURE 20.

*The envelope receiving and orienting system*

Turning now to the drawings, a hopper 2 is shown in FIGURE 1 to receive document transporting envelopes. The hopper 2 may have an inlet passing through the exterior wall of the bank with a known night depository door fitted thereto for receiving envelopes which are personally inserted therein by the depositor. Alternatively, or additionally, the hopper may have an inlet into which the postal authorities may empty the contents of a mail bag into which the document transporting envelopes have been segregated from the ordinary mail addressed to the bank. This segregation may be accomplished by the postal authorities in response to the bank giving these envelopes a unique code such as a particular postal box number.

Suitable means, such as a hopper vibrator and feed rollers (not shown), are provided to serially feed the deposited envelope to a known envelope orienting system 4, which inspects the envelope for an indicium, such as a stamp, and orients it with the same face up by feeding or not feeding the envelope through a pair of twisted inverting belts. Associated with the envelope orienting system is a metal detection device (not shown) to actuate the system to divert any envelope having a metallic enclosure; and an envelope thickness measuring system to divert any envelope containing more than a predetermined number of documents. The envelope orienting system transports each envelope to a buffer storage hopper 6. Suitable means, such as a hopper vibrator and feed rollers (not shown), are provided to serially feed oriented envelopes to the envelope opening system 8.

*The exemplary envelope*

It will be seen that the exemplary envelope 10 disclosed in FIGURES 15, 16, 17, and 18, consists of a paper blank 12 which is folded and glued. The blank 12 includes a recipient's address face panel 14, a sender's address face panel 16 joined to the panel 14 at a fold line 18, and a baffle panel 20 joined to the panel 16 at a fold line 22. A top flap 28 is joined to the panel 14 at a fold line 30. A left multifold plait 32 is provided by a leg panel 34 which is joined to the panel 14 at a fold line 36, a leg panel 38 which is joined to the panel 34 at a fold line 40, and a side flap 42 which is joined to the panel 38 at a fold line 44. A symmetrical right multifold plait 32' is provided by a leg panel 34', a fold line 36', a leg panel 38', a fold line 40', a side flap 42' and a fold line 44'. Adhesive is applied to one surface of the blank 12, as shown in FIGURE 16, at 42, 48, 50, 52, 54, 42', 50', 52', and 54'.

When the paper blank is folded and glued, as shown in FIGURES 17 and 18, the left fold line 36 forms the vertex of a first externally directed fold, the fold line 40 forms the vertex of a mediate, internally directed fold, and the fold line 44 forms the vertex of a second externally directed fold, to comprise the left plait 32. The right plait 32' is similarly comprised. The left and the right edges of the baffle panel 20 are respectively disposed in the first folds of the left and the right plaits, but are not joined thereto. The baffle panel 20 and the recipient's address panel 14 form a sub-enclosure which is adapted to receive a plurality of documents, shown as a single document 56.

An indicium 58, shown as a postage stamp, is disposed on the recipient's address panel 14 for sensing by the envelope orienting system. Indicia 60 and 60', shown as notches, are respectively provided through the external edges of the left and right plaits 32 and 32'.

A portion 62 of the upper surface of the panel 16 is coated with an agent for transferring impressions. The depositor writes his name and address on the portion of the panel 16 which is not covered by the flap 28 when the envelope is sealed, and also writes a listing of the documents enclosed on the portion of the panel 16 which is covered by the flap 28. The impression of this writing will be reproduced on the baffle panel 20.

*The envelope opening system*

The envelope opening system 8 is partially enclosed by a left side plate 70, a right side plate 72, a front plate 74 and a rear plate 76. An envelope entrance slot 78 is provided in the left side plate 70, and a guide plate 79 is suitably mounted to divide the slot into two parts, see FIGURES 2, 9 and 10.

A gate assembly 80, as shown in FIGURE 4, is provided adjacent the entrance slot to check the orientation and alignment of the document transporting envelope 10 as it is partly inserted through the entrance slot by the feed means from the buffer storage hopper 6. The gate assembly includes a cross rod 82 from which depend a left vertical rod 84, a right vertical rod 86 and a snap action switch 88. The cross rod 82 is constrained in suitable guides (not shown) for vertical reciprocation. A solenoid 90 is fixed to the rear plate 76 by a bracket 92 and has its plunger 94 connected to the left end of the cross rod 82. A tension spring 96 is fixed at one end to the rear plate 76 by a bracket 98 and at its other end to the left end of the cross rod 82. A similar assembly of a solenoid 90', a bracket 92', a solenoid plunger 94', a tension spring 96', and a bracket 98' is fixed to the front plate 74 and the right end of the cross rod 82. The tension springs normally bias the gate assembly into a lower position wherein the vertical rods 84 and 86 and the switch 88 preclude the complete passage of the envelope through the slot 78. The solenoids, when energized, elevate the gate assembly to permit the complete passage of the envelope.

When the envelope 10 is properly aligned with the gate assembly, the left portion of the leading edge of the envelope abuts the left vertical rod 84 and the notch 60 (or 60' depending on which end of the envelope is leading) receives the right vertical rod 86. Under these circumstances the sender's address face panel 16 of the envelope will be uppermost. The right portion of the envelope leading edge will also actuate the switch 88.

Figure 8:
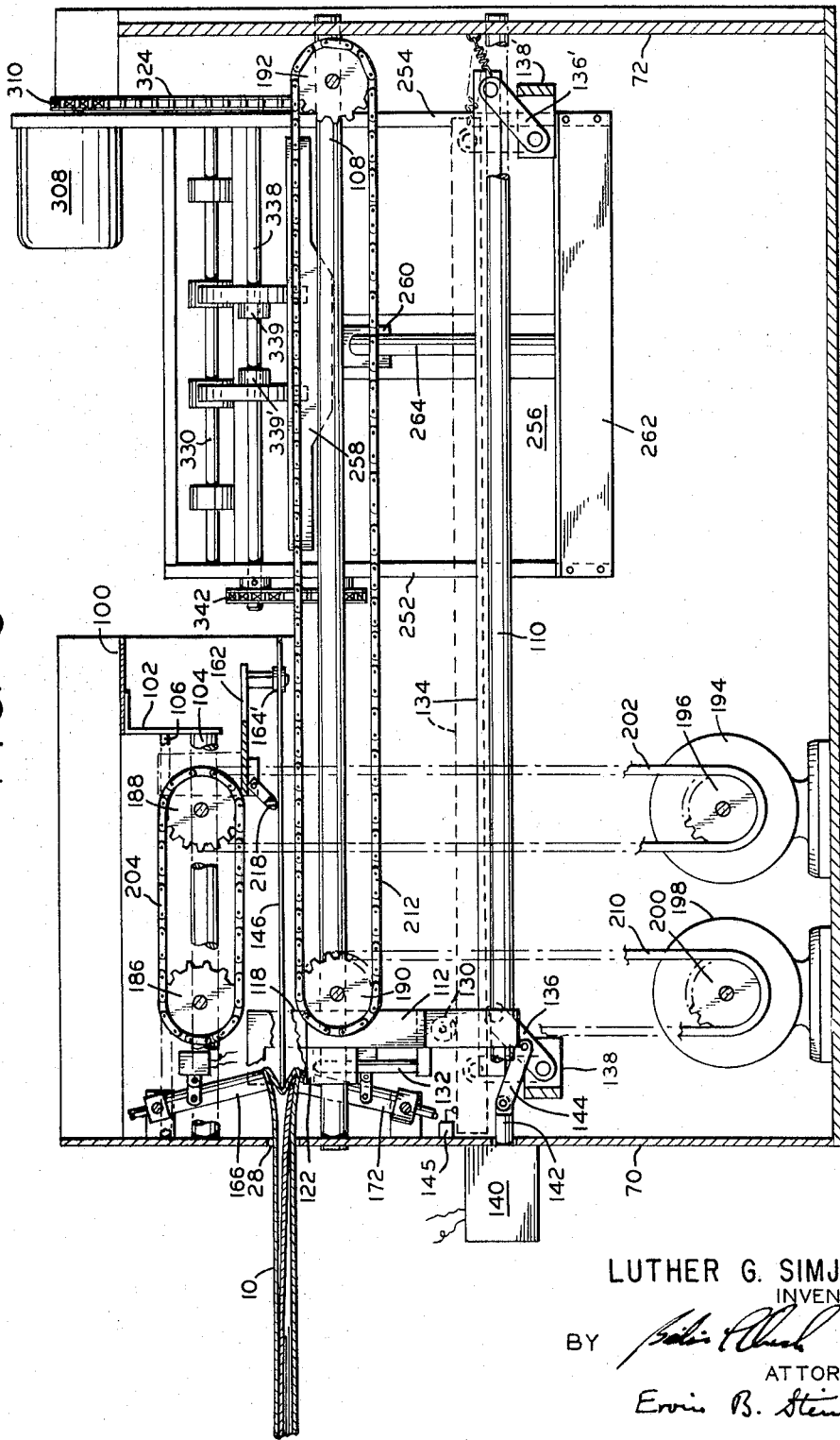
FIGURE 8 is a front view in cross-section taken along the line 8—8 of FIGURE 3 showing the envelope opening and document stacking assemblies.
Figure 13:
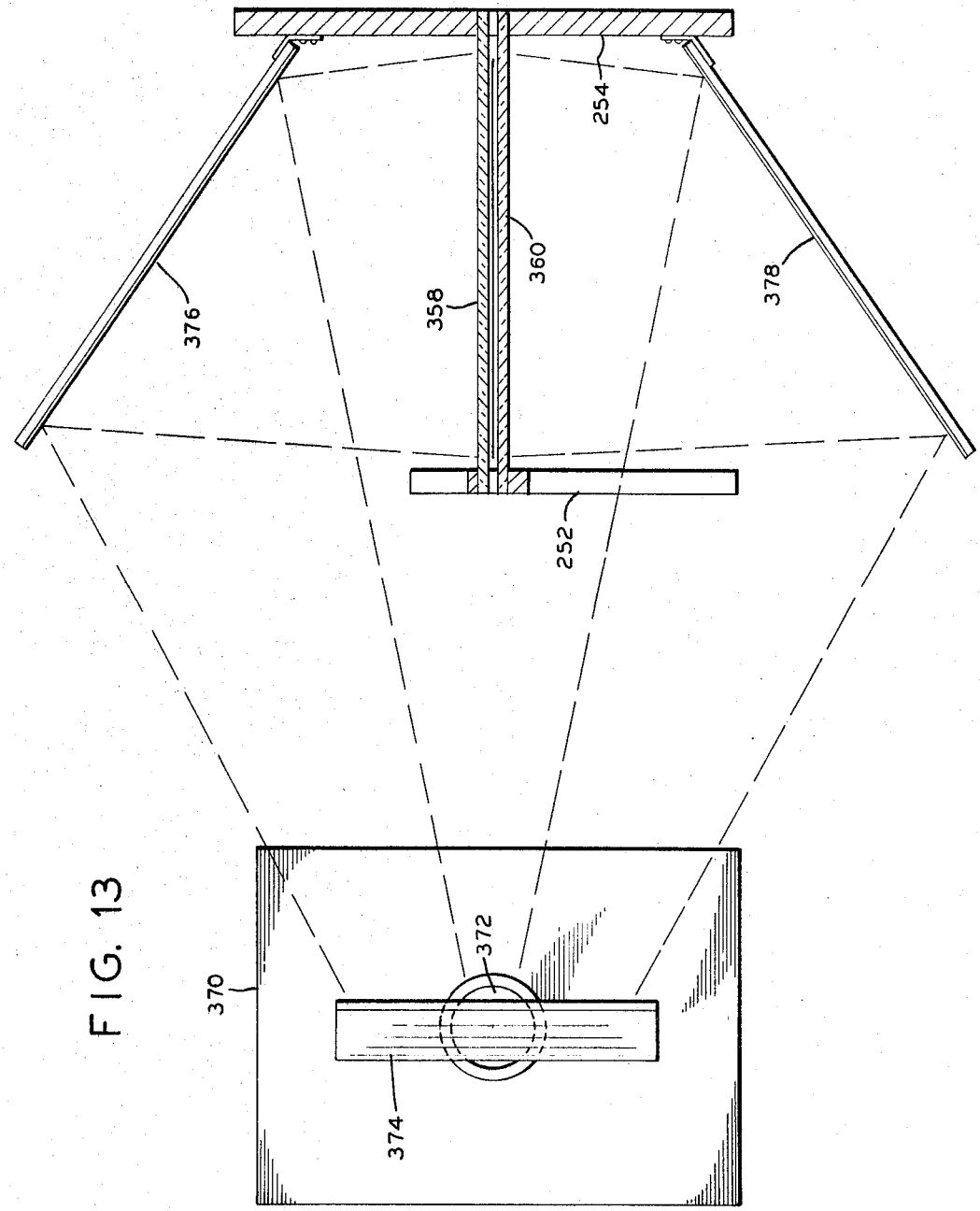
FIGURE 13 is a front view in cross-section taken along the line 13—13 of FIGURE 12, showing as a detail the field of view of the recording means.

A top cross plate 100, as seen in FIGURES 3 and 8, is secured between the top edges of the front plate 74 and the rear plate 76. A bracket 102 depends from the top cross plate. An upper support rod 104 and an upper guide rod 106 are secured between the left side plate 70 and the bracket 102. A lower support rod 108 and a lower guide rod 110 are secured between the left side plate 70 and the right side plate 72.

As seen in FIGURES 2 and 3, a clamp carriage block 112 has an upper horizontal hole 114 through which the lower support rod 108 is journaled, and a lower bifurcation 116 which is fitted about the lower guide rod 110. Fixed to the top of the block 112 is a horizontal upper clamp arm 118 which has a rubber faced clamp element 120 at its distal end. Pivotally mounted to the top of the block 112 is a lower clamp arm 122 which has a rubber faced clamp element 124 at its distal end. A short vertical guide rod 126 stands up from a knee in the block 112. A follower block 128 is journaled for vertical movement on the rod 126. The follower block carries a cam follower roller 130 and one end of a connecting rod 132, the other end of which rod bears against the lower clamp arm 122. The cam follower roller 130 thereby pivots the lower clamp element 124 against and away from the upper clamp element 120. As seen in FIGURES 3 and 8, a cam bar 134 is pivoted at one end to a link 136 which is also pivoted to a bracket 138 fixed to the front plate 74, and at its other end to a link 136' which is pivoted to a bracket 138' fixed to the front plate 74. A solenoid 140 is fixed to the left side plate 70 and has a plunger 142 which is coupled by a link 144 to the left link 136. The solenoid 140 thereby raises and lowers the cam bar 134. The cam bar is shown in FIGURE 8 in solid lines in its lower position, and in dotted lines in its raised position. Thus, when the cam bar solenoid 140 raises the cam bar 134, the cam follower roller 130 and the lower clamp element 124 are also raised. The cam bar is coextensive with the full range of travel of the clamp carriage block 112, and is thus able to control the movement of the lower clamp element at any horizontal position of the clamp carriage block. A switch 145 is mounted to the left side plate and is actuated by the cam bar in its raised position.

Referring to FIGURES 2, 3 and 7, a dagger 146, comprising a substantially U-shaped plate having a central cut-out 147, is disposed horizontally between and secured at its legs 146L and 146L' respectively to the front plate 74 and the rear plate 76. The dagger is substantially at the same horizontal level as the envelope entrance slot 78, and the point 146P of the dagger projects towards the slot 78. Two envelope opening wires 148 and 148' are secured to the dagger. One end of the wire 148 is pinned at 150 adjacent the point of the dagger. The other end of the wire 148 is secured to one end of a tension spring 152, the other end of which is pinned at 154 to the leg 146L of the dagger. Similarly, the wire 148' is pinned at 150', and by a tension spring 152' to the leg 146L'. The clamp elements 120 and 124 are disposed above and below the dagger 146 and its central cut-out 147, the upper clamp element 120 passing through the cut-out 147.

A carriage block 156 includes a lower horizontal hole 158 through which the upper support rod 104 is journaled, and an upper bifurcation 160 which is fitted about the upper guide rod 106. Fixed to the bottom of the block 156 is a horizontal plate 162. A pair of grooved rollers 164 and 164' are pined for free rotation to the underside of the plate 162. The rollers 164 and 164' are respectively engaged with the envelope opening wires 148 and 148'. When the block 156 is moved from the position shown in FIGURE 2 to the position shown in FIGURE 7, the rollers deflect the wires away from the center of the dagger. The springs 152 and 152' are extended to provide extra length to the wires as they are deflected.

A pair of suction tubes, as seen in FIGURES 2, 3, 5, and 8, coupled to a vacuum system 165 (FIG. 19A), is disposed adjacent the envelope entrance slot 78. The upper tube 166 is pivoted at 168 to a bracket 170 which is fixed to the left side plate 70 above the slot. The lower suction tube 172 is pivoted at 174 to a bracket 176 which is fixed to the left side plate 70 below the slot. A solenoid 178, which is fixed to the left side plate by a bracket (not shown), has a plunger 180 which is coupled by a link 182 to the upper suction tube. A similar solenoid 178' is coupled by a plunger 180' and a link 182' to the lower suction tube. The tubes are normally biased into the aligned vertical position which is shown in solid lines in FIGURE 5. When the solenoids 178 and 178' are actuated, the tubes are pivoted to the inwardly directed position which is shown in dotted lines. A snap action switch 184 is also mounted to a bracket (not shown), and is actuated by the lower suction tube after it is pivoted into the inwardly directed position.

A plurality of sprocket wheels, as seen in FIGURES 2, 3, and 8, are rotatably mounted to the inside of the front plate 74. A single sprocket wheel 186 and a double sprocket wheel 188 are mounted on the same horizontal level as the upper support rod 104. A double sprocket wheel 190 and a single sprocket wheel 192 are mounted on the same horizontal level as the lower support rod 108. A motor 194 driving a sprocket wheel 196 is mounted below the upper double sprocket wheel 188, and a motor 198 driving a sprocket wheel 200 is mounted below the lower double sprocket wheel 190. A vertical sprocket chain 202 couples the motor sprocket wheel 196 and the outer set of sprockets of the double sprocket wheel 188. A horizontal sprocket chain 204 couples the inner set of sprockets of the double sprocket wheel 188 and the single sprocket wheel 186. A horizontal pin 206 is fixed to one element of the chain 204, and the distal end of this pin rides in a vertical slot 208 in the carriage block 156. As the chain 204 is driven by the motor 194 in a single direction the pin 206 reciprocates the carriage block over the full length of the upper support rod 104. A vertical sprocket chain 210 couples the motor sprocket wheel 200 and the outer set of sprockets of the double sprocket wheel 190. A horizontal sprocket chain 212 couples the inner set of sprockets of the double sprocket wheel 190 and the single sprocket wheel 192. A horizontal pin 214 is fixed to one element of the chain 212, and the distal end of this pin rides in a vertical slot 216 in the clamp carriage block 112. As the chain 212 is driven by the motor 198 in a single direction the pin 214 reciprocates the clamp carriage block over the full length of the lower support rod 108.

The horizontal plate 162 also carries a pair of pivoted push fingers 218 and 218' as seen in FIGURES 2, 8, 9 and 10. The upper end of the push finger 218 is pivotally mounted to a bracket 220 which is fixed to the underside of the plate 162. The lower end of the finger carries a rubber tip. The finger 218' is similarly provided with a bracket 220' and a tip. The length of the fingers from their upper pivots to the ends of their rubber tips is greater than the perpendicular distance from the pivots to the dagger 146 below. Thus, when the plate and the fingers are carried away from the envelope entrance slot 78, the finger ends ride freely over the dagger; but when the fingers are carried towards the slot, the fingers bear down against the dagger. A platform 222 is fixed beneath the dagger.

A known stamp mechanism, as seen in FIGURES 2 and 3, is provided to cooperate with the envelope opening system. An upper die 224 is pivotally mounted to the rear plate 76 and is solenoid actuated; and a lower anvil 226 is fixed to plate 76 and the anvil is solenoid actuated. When actuated, the die and the anvil approach each other through the central opening 147 in the dagger 146. The die and the anvil are normally biased away from the dagger. The die contains a known indexing mechanism for a numerical stamp whereby each actuation of the stamp mechanism will print a unique and consecutive number. A switch 227 is mounted to the rear plate and is actuated by the die as it lowers to oppose the anvil in stamping the envelope.

*The operation of the envelope opening system*

The envelope receiving and orienting system delivers the envelope 10 to the opening system by passing one end of the envelope through the slot and between the vertically aligned suction tubes 166 and 172 until the leading edges 36 and 44 abut the gate assembly 80. The sender's address face panel 16 of the envelope 10 is uppermost, the right vertical rod 86 enters the envelope notch 60, and the leading edges actuate the snap action switch 88.

The vacuum system develops a vacuum at the suction tubes, which draw the two folds of the envelope plait apart. After a short delay, the gate solenoids 90 and 90' are energized to raise the gate assembly 80, and the suction tube solenoids 178 and 178' are energized to pivot the suction tubes to the dotted line position shown in FIGURE 5. The tubes draw the envelope plait onto the point 146P of the dagger, and the lower tube 172 actuates the snap action switch 184.

The envelope clamp carriage 112 is initially in the position designated "A" in FIGURE 2 and the clamp elements 120 and 124 are respectively disposed above and below the dagger point 146P. When actuated, the switch 184 energizes the clamp bar solenoid 140, which raises the cam bar 134 to the dotted line position shown in FIGURE 8. The cam follower roller 130 rises with the cam bar and pivots the lower clamp arm 122 to clamp the two folds of the envelope plait about the dagger point between the clamp elements. The switch 145 is actuated by the raised cam bar.

After a short delay, the clamp transport motor 198 is energized, which drives the clamp transport sprocket chain 212 and the pin 214 to traverse the clamp carriage block away from the envelope entrance slot 78. The rubber faced clamp elements draw the envelope plait over the smooth surface of the dagger and drive the dagger point through the inner envelope fold 40. The roller plate carriage block 156 is at this time in its extreme right hand position, as shown in FIGURE 2. After the envelope has been drawn adequately onto the dagger to fully sever the inner fold 40, the clamp carriage actuates a switch 228 which pulses the stamp solenoid to pivot the die 224 toward the anvil 226 to stamp the envelope on the fly. As the die lowers, it actuates the switch 227. As the clamp carriage continues to traverse, it actuates a switch 230 to energize the roller plate carriage drive motor 194. The motor 194 drives the chain 204 and the pin 206 to traverse the plate and the rollers 164 and 164′ toward the envelope entrance slot 78. As the dagger enters the envelope it carries the opening wires 148 and 148′ within the envelope. The rollers now pull the wires through and sever the long folds of the envelope, as shown in FIGURE 6. The clamp carriage and the roller plate carriage continue to traverse until the other end of the envelope is severed, as shown in FIGURE 7. Referring to FIGURES 17 and 18, it will be seen that the dagger enters the envelope between the panels 16 and 20, and as the panel 16 is uppermost, the panel 16 is therefore above the dagger, while the panel 20, the document 56 and the panel 14 are below the dagger. When the roller plate reaches the position shown in FIGURE 7, having traveled a distance equal to the length of the envelope, the three panels have been severed from each other. As the clamp carriage continues to traverse to the right it actuates a switch 232 which causes the clamp carriage motor to be deenergized, halting the traverse of the clamp carriage, and also causes the cam bar solenoid to be deenergized, releasing the envelope panels and the documents from the grip of the clamp elements. The roller plate carriage drive motor, however, continues to be energized and the pin 206 in the slot 208 traverses the plate carriage back to its right hand position, shown in FIGURE 2, and into a second cycle towards the entrance slot 78. This second cycle starts at the time the clamp elements release the envelope. The panel 20, the document 56 and the panel 14 are supported by the platform 222 fixed below the dagger. The panel 16 lies on top of the dagger and is otherwise not constrained. As the roller plate carriage 156 traverses towards the entrance slot in its second cycle, the fingers 218 and 218′ push the panel 16, which was previously stamped by the die 224, off the dagger and through the envelope entrance slot. As shown in FIGURE 10, the lower end of the guide plate 79 is slightly below the upper surface of the dagger and, therefore, the panel 16 passes above the guide plate. The curved guide plate deflects the envelope above and to the rear of the input flow of envelopes, as shown in FIGURE 1. The panel 16 bears a transaction number provided by the stamp die 224 and constitutes a receipt of the transaction. This receipt may be fed directly back to the depositor, or inserted into a window-type envelope for mailing to the depositor.

As the platform carriage traverses towards the envelope entrance slot in its second cycle, it is effective to actuate a switch 233. The switch 233 reenergizes the clamp bar solenoid 140 to cause the clamp elements 120 and 124 to grip the remaining envelope panels and the documents resting on the fixed platform 222. The switch 233 after a delay also reenergizes the clamp carriage drive motor 198 which traverses the clamp carriage further away from the envelope entrance slot 78 towards the right. When the clamp carriage reaches the dotted line position which is marked "B" in FIGURE 2, it actuates a switch 234. The switch 234 deenergizes the cam bar solenoid 140, causing the clamp elements to release the panels and documents. When the clamp carriage reaches the dotted line position which is marked "C" in FIGURE 2, it actuates a switch 236. The switch 236 deenergizes the clamp carriage drive motor 198, halting the clamp carriage. The roller plate carriage at the end of its second angle is effective to actuate a switch 237, which deenergizes the motor 194, halting the carriage.

*The envelope panels and contents recording and stacking system*

The system 250, which individually and serially records each of the remaining panels of the envelope and the contained documents, is shown in FIGURES 1, 2, 8, 9, 10, 11, 12, and 13. A left side plate 252 and a right side plate 254 fixedly support therebetween a U-shaped guide plate 256 for an escalator tray 258. The tray has a concave portion with a central axis extending from its front to its rear, and this tray is fixed on the top of the tray carriage block 260. A front plate 262 is also fixed between the left and the right plates and this plate supports one end of a guide rod 264 below the center cut-out of the guide plate 256. The bottom of the tray carriage block 260 includes a hole 266 through which the guide rod 264 is journaled. A cross-rod 268 is pinned through the block 260 and each end of this rod has rotatably mounted thereon a spool 270 and 270′ respectively. A pair of constant tension flat springs 272 and 272′, such as a "Negator," are respectively wound around these spools, and the free ends of the springs are pinned, at 274 and 274′, respectively, to the rear portion of the guide plate. These springs serve to bias the tray towards the rear of the guide plate, the rear edge 276 of the tray sliding along the upper surface of the guide plate. A solenoid 278 is fixed to the front plate, and operates a plunger 280 which is coupled by a link 282 to one end of a latch 284. This latch is centrally pivoted to a bracket 286 which is also fixed to the front plate. The other end of this latch is adapted to engage a tooth 288 upstanding on the block 260. The latch is biased towards its tooth engaging position by a tension spring 290 which is pinned between the latch and the front plate. The tooth and the latch have suitable mutual camming surfaces and interengaging surfaces. A link 291 is pivoted at one end to the bottom of the block. The other end of this link has a depending tooth 292 and a projecting pin 294. A gear 295, a sprocket wheel 296, and a sprocket wheel 297 are fixed to a shaft 299 which is journaled through the side plates 252 and 254. The sprocket wheel 296 carries a sprocket chain 298 which is also carried by a sprocket wheel 300. The sprocket wheel 300 is rotatably mounted between the side plates on a cross-rod 301. An element of the sprocket chain 298 carries a projecting pin 302 which is adapted to engage the tooth 292 and thereby to traverse the tray carriage block towards the front plate when the sprockets are rotated clock-wise. A guide plate 304 fixedly projects from the right side plate, and a bent flat spring 306 is pinned to the front plate. After the "Negator" springs traverse the carriage block to the rear, the chain pin 302 engages the link tooth 292 and thereby traverses the carriage block forwardly, the link pin 294 passing under the guide plate 304. Prior to the end of travel of the block, the link pin abuts the spring 306 and deflects it downwardly. When the link passes beyond the guide plate the spring raises the link pin above the guide plate. When the carriage block is traversed again to the rear by the "Negator" springs the link pin rides above the guide plate and does not interfere with the sprocket chain until it drops off the rear edge of the guide plate to be subsequently engaged by the chain pin 302.

A motor 308 is fixed to the right side plate 254 and rotates a sprocket wheel 310. Three shafts 312, 314, and 316 are journaled through the right and the left side plates and respectively have fixed thereto three sprocket wheels 318, 320, and 322. Each of these shafts carries a plurality of rubber rollers, as shown in FIGURE 11. The motor 308 drives the shafts 312, 314, and 316 by means of a sprocket chain 324 passed around these sprocket wheels. A shaft 326 is journaled through the side plates below the shaft 316, and carries a plurality of rubber rollers which engage the rollers on the shaft 316. Two shafts 328 and 330 are journaled through the side plates above the shaft 314. Each shaft carries a staggered plurality of rubber rollers which engage the rollers on the shaft 316.

A shaft 332 is journaled through the side plates below the shaft 312. This shaft 332 carries a plurality of rubber rollers which engage the rollers on the shaft 312 through a plurality of cut-outs 333 in the rear of the guide plate 256, and a gear 334 which meshes with the gear 295. A magnetic brake 336 is coupled between the shaft 332 and the right side plate 254. A shaft 338 is journaled through the side plates and carries a sprocket wheel 340 and a plurality of rubber rollers mounted on one way clutches 339 and 339'. When the tray is in its rear or upper position, which is shown in dotted lines in FIGURE 12, these rollers abut the rear portion of the tray. A sprocket chain 342 interconnects the sprocket wheel 340 with the sprocket wheel 297.

A light source 344 and a photoelectric detector 346 are fixed by suitable brackets (not shown) to inspect the nip of the rollers on the shafts 312 and 332. When the leading edge of a document enters this nip and interrupts a light beam between the source and the detector, the magnetic brake 336 is pulsed to momentarily stop and then slow the rotation of the shaft 332 with respect to the shaft 312. The shaft 312, which is positively driven by the sprocket chain 324, normally drives the shaft 332 by their frictionally interengaged rollers.

Although the shaft 312 is positively driven by the sprocket chain 324 and is rigidly journaled through the right and the left side plates, it is desirable that its rollers be resiliently biased towards the shaft 332. As seen in FIGURE 14, the rubber rollers 348 are mounted on a tubular shaft 350 through which the shaft 312 passes. The tubular shaft is resiliently coupled at each of its ends to the central shaft 312 by a pair of respective sheet metal bellows 352 and 352' fixed between the tubular shaft and a pair of respective rings 354 and 354'. The rings are fixed to the central shaft by suitable means, such as set screws. The tubular shaft thus rotates with the central shaft, but is permitted to become eccentric to the central shaft by the flexibility of the bellows.

A pair of friction surfaces 356 and 356' is provided on the upper surface of the guide plate 256, and each has a length which extends through and beyond the traverse of the gear edge of the tray.

Disposed between the side plate and between the pairs of shafts 316, 326, and 314, 328, is a pair of vertically spaced apart glass plates 358 and 360. A snap action switch 362 is fixed to the left side plate and is actuated by a cross-shaft 364 which is journaled between the side plates. This actuator carries a pair of feelers 366 and 366', which pass below the shafts 330 and 328, above the shaft 324, and around the front, the top, and the rear of the pair of glass plates. A receptacle 368, here shown as a box, but which may incorporate the security receptacle disclosed in my copending application, Serial No. 187,511, filed April 16, 1962, and entitled "Depository Machine Combined With Image Recording Means," now U.S. Patent No. 3,173,742, dated March 16, 1965, is disposed behind and below the shafts 316 and 326.

A camera 370 includes a lens 372, which views an angled front surfaced mirror 374, which in turn views a pair of spaced apart and angled front surfaced mirrors 376 and 378, which in turn view the two glass plates 358 and 360. The camera is thereby focused on the space between the two glass plates. A known film transport and shutter mechanism is coupled via a flexible shaft 380, a clutch 382 and a clutch engaging solenoid 384 to the shaft 316. Suitable light sources are also supplied.

*The operation of the recording and stacking system*

The tray is initially in its forward and low position, with the latch 284 interlocked with the upstanding tooth 288. The clamp elements 120 and 124 release the remainder of the envelope and the documents which fall onto the tray 258, as shown in FIGURE 10 and FIGURE 2, position B. The clamp carriage block continues to traverse towards the right until it abuts the switch 236, which switch deenergizes the motor 198 and also pulses the solenoid 278. The solenoid tips the latch 284 to release the tooth 288 on the tray carriage block 260. The roller plate carriage now actuates the switch 237 which deenergizes its motor 194, and also energizes the motor 308. The block is drawn rearwardly and upwardly by its springs until the topmost paper on the tray, which is the baffle panel 20, is engaged by the rubber rollers 348, causing the stack of papers to conform to the concave shape of the tray. The rear edge of the stack also tends to shift until the rear edges of the papers abut the friction surfaces 356 and 356' on the guide plate 256. The rotation of the rollers 348, which are in frictional engagement with the top paper, strip this top paper off the stack, towards the rear. The rest of the stack tends to move towards the rear with the top paper. However, the frictional retarding force provided by the friction surfaces and the curvature of the papers is greater than the adhesion between the top paper and the next-to-top paper, and only the top paper is stripped off. As the rear leading edge of the stripped off top paper is fed into the nip of the rollers on the shafts 312 and 332, the photocell light beam is interrupted and the magnetic brake is first fully energized, and then partly energized, initially stopping and subsequently slowing the rotation of the shaft 332. The rollers on the shaft 314 have a higher peripheral surface speed than the rollers on the shaft 338, and snatch the top paper from the rollers 348 on the shaft 338 which idle on their one-way clutches 339 and 339'. If by accident two papers have been stripped off the stack, the rubber rollers on the shaft 312 will advance the top paper while the rubber surfaces of the rollers on the halted shaft 332 will hold the lower paper until the top paper has cleared. That is, when the lower rollers are first fully braked, the static friction force between the upper rubber rollers and the upper surface of the top paper, and the dynamic friction force between the lower rubber rollers and the lower surface of the lower paper, are each greater than the static friction force between the two papers. The static friction engagement between the two papers is thus overcome. The lower rollers are only instantaneously fully braked, and subsequently are partly braked. The friction forces between the rollers and the papers are still greater than the dynamic friction force between the papers and the top paper is slid by the top rollers over the bottom paper which is retarded by the lower rollers. The top paper is fed by the rollers on the shaft 312 into the nip of the rollers on the shaft 330 and the shaft 314. The leading edge of the paper here deflects the feelers 366 and 366' on the cross-shaft 364, which actuates the switch 362, and which switch energizes the solenoid 384. The solenoid engages the clutch 382 to advance the film transport and shutter of the camera 370 in coordination with the advance of the paper from the rollers of the shafts 328 and 314 between the glass plates 358 and 356. The feelers remain elevated until the trailing edge of the paper passes from between the glass plates. The paper, which has been photographed from above and below as it passes between the glass plates, is now fed by the rollers on the shafts 316 and 326 into the receptacle. Each of the papers in the stack is similarly and sequently stripped, photographed and stacked. The stack in the receptacle is in inverse order to that on the tray, and the documents from each envelope have a panel of that envelope immediately above and below them. Alternatively, the papers may be passed out of the machine immediately after photographing for processing by the bank employees.

When the last paper on the tray 258 has been removed by the rollers on the shaft 338, the tray has been advanced by the springs 272 and 272′ to a position at which the pin 294 falls off the rear edge of the guide plate 304, pivoting the link 290 downwardly. As the chain 298 rotates, its pin 302 engages the tooth 292 on the link 290 and carries the tray carriage 260 rearwardly and downwardly until the latch 284 snaps over the upstanding tooth 288 on the tray carriage, and the front of the tray 258 actuates a switch 390. The switch 390 deenergizes the motor 308 and energizes the clamp carriage motor 198, which traverses the clamp carriage towards the entrance slot. When the clamp carriage reaches its start position adjacent the dagger point 146P it actuates the switch 392, which deenergizes the motor 198 and recycles the system.

While the operation of this system has been disclosed with respect to the baffle panel envelope transporting several documents which is shown in U.S. Patent No. 3,187,986 supra, the system may also be used with the envelope transporting a single document shown in U.S. Patent No. 3,187,985 supra. In the latter case, it may be desired to photograph only the document and not the envelope. An example of this would be where a single proxy card is the only document transported by the envelope. In such event, the camera may be set to operate on every third paper commencing with the second paper.

The electrical system

One embodiment of a suitable electrical control system is shown in FIGURES 19A and 19B. This system utilizes both A.C. and D.C. circuitry. The main power input is controlled by a switch 600, which is in series with the A.C. lines 602 and 602′, a D.C. rectifier 604, and the D.C. lines 606 and 606′. A four deck, twelve level, stepping switch 608 is advanced by a stepper coil 610 having a set of self-interrupting contents 612. The first deck 608–1 is used as a control deck to operate the stepper coil 610 while the decks 608–2, 608–3, 608–4 control the system functions. The light circuitry 614 for the camera is connected across the A.C. lines and is energized whenever the machine is energized.

A switch 615A is coupled to the buffer storage hopper 6 to sense the presence of at least one envelope in buffer storage. A single cycle feeding means 615B is also coupled to the buffer storage hopper, and when energized feeds one envelope from buffer storage through the slot 78 to the gate assembly. The stepping switch is normally homed with the moving contact in each deck at its "0" level. When the switch 615A is closed by an envelope in buffer storage, it couples the single cycle feeding means 615B across the A.C. lines through contact 608–4–0. The feeding means is energized for one cycle to feed one envelope through the slot 78. When the gate assembly switch 88 is closed, the stepper coil is coupled across the D.C. lines and steps the moving contact of each deck to the "1" level. The gate assembly solenoids 90 and 90′ are energized by an off-normal switch 608-O.N. In the second deck 608–2, at the "1" level, the suction tube solenoids 178 and 178′ are coupled by contact 608–2–1 across the A.C. lines and are energized to pivot the suction tubes. When the suction tube switch 184 is closed at 608–1–2, the switch is stepped to the "2" level. The solenoids 178 and 178′ remain energized at 608–2–2. The clamp bar solenoid 140 is energized at 608–4–2, clamping the envelope onto the dagger point 146P. When the cam bar switch 145 is closed at 608–1–2, the switch is stepped to the "3" level. The clamp carriage motor 198 is energized at 608–2–3. The cam bar solenoid remains energized at 608–4–3. When the clamp carriage closes the stamp switch 228 at 608–1–3, the switch is stepped to the "4" level. The clamp carriage motor 198 remains energized at 608–2–4. The cam bar solenoid remains energized at 608–4–4. The stamp solenoid 616 is pulsed at 608–3–4. As the stamp anvil rises, it closes the anvil switch 227 at 608–1–4, and the switch is stepped to the "5" level. The clamp carriage motor 198 remains energized at 608–2–5. The cam bar solenoid remains energized at 608–4–5. When the clamp carriage actuates the switch 230 at 608–1–5, the switch is stepped to the "6" level. The clamp motor 198 remains energized at 608–2–6. The roller plate carriage motor 194 is energized at 608–3–6. The cam bar solenoid remains energized at 608–4–6. When the clamp carriage actuates the switch 232 at 608–1–6, the switch is stepped to the "7" level. The clamp motor is deenergized at 608–2–7 and the clamp carriage is halted. The cam bar solenoid is deenergized at 608–4–7, releasing the divided envelope and documents. The roller plate carriage remains energized at 608–3–7 and the fingers 218 and 218′ push the receipt portion of the envelope out of the machine. When the roller plate carriage actuates the switch 233 at 608–1–7, the switch is stepped to the "8" level. The cam bar solenoid 140 is energized at 608–4–8. The clamp carriage is energized at 608–2–8. The roller plate motor remains energized at 608–3–8. When the clamp carriage actuates the switch 234 at 608–1–8, the switch is stepped to the "9" level, the cam bar solenoid is deenergized at 608–4–9, dropping the envelope and documents on the tray 258. The clamp motor 198 remains energized at 608–2–9. The roller plate motor 194 remains energized at 608–3–9. When the clamp carriage actuates the switch 236 at 608–1–9, the switch steps to the "10" level. The clamp motor 198 is deenergized at 608–2–10, halting the clamp carriage. The tray solenoid 278 is pulsed at 608–2–10, releasing the tray 258. When the roller plate carriage actuates the switch at 608–1–10, the switch steps to the "11" level. The roller plate motor 194 is deenergized at 608–3–11, halting the roller plate carriage at the end of its second cycle. The motor 308 and a magnetic brake enabling relay 650 are energized at 608–2–11. The motor 308 drives the shafts of the recording and stacking system 250. The relay 650 closes a normally open contact 650–1 to couple the photocell 346 in series with a relay coil 652 across the D.C. lines. The relay coil 652 is normally energized when the light beam is uninterrupted to the photocell 346. Its contacts 652–1 and 652–2 are normally closed contacts which are open so long as the relay coil 652 is energized. When the light beam to the photocell 346 is interrupted, the relay coil 652 is deenergized, and the contacts 652–1 and 652–2 close. A slow to operate relay coil 654 is in series with the contact 652–2 across the D.C. line. Its normally closed contact 654–1 is in series with the contact 652–2 and the magnetic brake 336 across the D.C. lines. The brake is also in series with a resistor 656 and the contact 652–1. Thus, when the light beam is interrupted, the relay coil 652 is deenergized, the contacts 652–1 and 652–2 are closed, and the brake 336 and the relay coil 654 are energized. After a delay, the contact 254–1 opens, and the brake is only partly energized through the resistor 656.

The camera clutch solenoid 384 is in series with the feeler switch 362, across the A.C. lines. When a paper raises the feelers to actuate the switch 362, the camera is operated.

When the tray 258 is restored, it actuates the switch 390 at 608–1–11. The switch steps to the "12" level. The clamp motor 198 is energized at 608–2–12. When the clamp carriage actuates the switch 392, the switch is stepped to home to the "0" level.

The modification of the envelope opening system

A modification of the envelope opening system is illustrated in FIGURES 20 and 21. A dagger assembly having a scissors action is substituted for the dagger 146, the wires 148 and 148', and the rollers 164 and 164'. This scissors-dagger includes a main blade 400 having a thickened head portion 402 bearing a pointed subportion 402P, and a leg portion 404 which is fixed to the front plate 74. Two blades 406 and 408 are pivotally mounted at 410 to the main blade 400. A cross-link 412 is also pivotally mounted to the main blade 400 at 414. The link carries a stud 416 which is slidably disposed through a slot 418 in the blade 406, and a stud 420 which is slidably disposed through a slot 422 in the blade 408. A linear actuator 424 is mounted by a bracket (not shown) to the rear plate 76, and has a plunger 426. The plunger is pivotally coupled at 428 by a link 430 to the distal end of the blade 406 at 432.

In operation, the blades 406 and 408 are initially in their substantially closed position, which is shown in dotted lines in FIGURE 20. The leading plait of the envelope 10 is brought onto the pointed subportion 402P of the main blade 400 by the suction tubes as previously described. The envelope is then advanced on the main blade by the clamp assembly to the position shown in solid lines in FIGURE 20, slitting the leading edge of the envelope. The linear actuator 424 is then energized, spreading apart the blades 406 and 408 to the position shown in solid lines in FIGURE 20, the blade 408 being constrained to follow the motion of the blade 406 by the cross-link 412. The envelope is concurrently advanced further on the main blade 400 to the position shown in dotted lines, slitting the sides and the trailing edge of the envelope.

The stamping of the indicia adjacent the head portion 402 and the ejection of the severed receipt are accomplished as previously described.

Another modification of the envelope opening system comprises the substitution of a dagger assembly having a head portion which is pivoted to the main portion. After the dagger has been inserted through the leading and trailing plaits of the envelope, the head portion is pivoted through 360° to sever the envelope completely.

A further modification of the envelope opening system comprises the use of an envelope having the two folds of each plait of unequal width, i.e. the leg panels 34 and 38 are of unequal width. In such a case a mechanical depressor and pincer is substituted for the suction tubes and is utilized to grasp the longer fold to spread apart the plait and to advance the envelope onto the dagger.

*The modification of the recording system*

A modification of the recording system comprises the provision of a document guide and alignment mechanism in the path of the documents before the rollers which feed the documents between the glass plates for recording. The documents may be of various dimensions and it is desirable that they be aligned to preclude the possibility of their jamming while passing between the glass plates. The mechanism may be of a known type including a guide bar and angled rollers to direct each document against the guide bar.

While certain embodiments of this invention have been shown and described, it will be apparent to those skilled in the art that modifications may be made without departing from the principles of this invention which shall be limited solely by the scope of the appended claims.

What is claimed is:

1. A document handling system comprising:
  receiving means for receiving an envelope which is adapted to enclose a document between its side panels;
  severing means disposed for engaging a received envelope and for dividing the envelope into independent first and second side panels, leaving any document enclosed in the envelope juxtaposed between the independent panels;
  feeding means for feeding the first side panel, any document enclosed in the envelope, and the second side panel; and
  control means coupled to said receiving means, said severing means and said feeding means for sensing the receipt of an envelope by said receiving means and in response thereto causing the operation of said severing means and said feeding means.

2. A document handling system comprising:
  storage means for receiving a plurality of envelopes, each adapted to enclose a document between its side panels;
  receiving means for receiving an envelope;
  cyclically operable feeding means for feeding, when actuated, one envelope from said storage means to said receiving means;
  severing means disposed for engaging each received envelope and for dividing this envelope into independent first and second panels, leaving any document enclosed in this envelope juxtaposed between these independent panels;
  additional feeding means for feeding the first side panel, any document enclosed in the envelope, and the second side panel of each divided envelope; and
  control means coupled to said storage means, said cyclically operable feeding means, said severing means and said additional feeding means for sensing the presence of an envelope in said storage means and in response thereto causing the sequential operation of said cyclically operable feeding means, said severing means and said additional feeding means.

3. A document handling system comprising:
  storage means for receiving an envelope adapted to enclose a document between its side panels;
  receiving means for receiving an envelope;
  first feeding means for feeding an envelope from said storage means to said receiving means;
  severing means for engaging a received envelope and for dividing this received envelope into independent first and second panels, leaving any document enclosed in this envelope juxtaposed between these independent panels;
  second feeding means for feeding the panels and any document from said severing means; and
  control means coupled to said storage means, said first feeding means, said receiving means, said severing means, and said second feeding means, for sensing the presence of an envelope in said storage means and in response thereto causing the sequential operation of said above mentioned means.

4. A document handling system comprising:
  receiving means for receiving an envelope which is adapted to enclose a document between its side panels;
  severing means disposed for engaging a received envelope and for dividing this envelope into independent first and second panels, leaving any document enclosed in this envelope juxtaposed between these independent panels;
  storage means;
  feeding means for feeding one of the independent panels and any document enclosed in the envelope to said storage means; and
  control means coupled to said severing means and said feeding means for causing, when actuated, the operation of said severing means and said feeding means.

5. A document handling system comprising:
  receiving means for receiving an envelope which is adapted to enclose a document between its side panels;
  severing means disposed for engaging a received envelope and for dividing this envelope into independent first and second panels, leaving any document enclosed in this envelope juxtaposed between these independent panels;
  storage means;

feeding means for feeding one of the independent panels and any document enclosed in the envelope to said storage means; and control means coupled to said receiving means, said severing means and said feeding means for sensing the receipt of an envelope by said receiving means and in response thereto causing the serial operation of said severing means and said feeding means.

6. A document handling system comprising:

receiving means for serially receiving a plurality of envelopes, each adapted to enclose a document between its side panels;

severing means disposed for serially engaging each received envelope and for dividing this envelope into independent first and second panels, leaving any document enclosed in this envelope juxtaposed between these independent panels;

storage means;

feeding means for serially feeding one of the independent side panels and any document enclosed in the envelope to said storage means, whereby documents from different envelopes are separated by side panels from respective envelopes.

7. A document handling system according to claim 6 wherein said storage means is so constructed and arranged as to dispose the documents and the side panels fed thereto in a stack.

8. A system according to claim 6 wherein said feeding means feeds the panels and the documents to said storage means in the order of the receipt of the respective envelopes.

9. A document handling system comprising:

receiving means for receiving an envelope which is adapted to enclose a document between its side panels;

severing means disposed for entering a received envelope between its side panels and for dividing the envelope into independent first and second side panels, leaving any document enclosed in the envelope juxtaposed between the independent panels;

feeding means for feeding the first side panel, any document enclosed in the envelope, and the second side panel; and control means coupled to said receiving means, said severing means and said feeding means for sensing the receipt of an envelope by said receiving means and in response thereto causing the operation of said severing means and said feeding means.

10. A system according to claim 9 wherein said severing means enters the envelope at one end thereof.

11. A document handling system comprising:

receiving means for receiving an envelope which is adapted to enclose a document between its side panels;

severing means disposed for engaging a received envelope and for dividing the envelope into independent first and second side panels, leaving any document enclosed in the envelope juxtaposed between the independent side panels;

image recording means having a field of view;

feeding means for serially feeding one of the side panels and any document enclosed in the envelope through said field of view; and control means coupled to said receiving means, said severing means, said feeding means and said image recording means, for sensing the receipt of an envelope by said receiving means and in response thereto causing the operation of said severing means and said feeding means, and for sensing the passage of the fed side panel and any document to said field of view and in response thereto causing the operation of said image recording means.

12. An apparatus for receiving and opening an envelope having a pair of side panels which are joined to one another along junctions, comprising:

severing means adapted to enter an envelope between the side panels and to sever these panels along their junctions; and means for providing relative motion between said severing means and the envelope for causing said severing means to enter the envelope and to sever the junctions.

13. An apparatus for opening an envelope having a pair of side panels, comprising:

support means for supporting an envelope;

severing means for entering the envelope between the side panels and for severing these panels apart from each other; and coupling means coupled to said support means and said severing means for providing, when actuated, relative motion between said support means and said severing means, whereby said severing means enters and opens the envelope.

14. An apparatus according to claim 13 further including:

feeding means for feeding one of the severed panels in one direction and for feeding the other of the severed panels in another direction.

15. An apparatus according to claim 13 further including:

means for applying an indicium to one of the panels;

feeding means for feeding the one severed panel bearing the indicium in one direction and for feeding the other of the severed panels in another direction; and control means coupled to said coupling means, said indicium applying means and said feeding means for causing, when actuated, the operation of these means.

16. An apparatus for opening an envelope having a pair of side panels, comprising:

support means for supporting an envelope;

severing means for entering the envelope between the side panels and for severing these panels apart from each other; and coupling means coupled to said support means and said severing means for moving, when actuated, said support means with respect to said severing means.

17. An apparatus for opening an envelope having a pair of side panels, comprising:

support means for supporting an envelope;

severing means for entering the envelope between the side panels and for severing these panels apart from each other; and coupling means coupled to said support means and said severing means for moving, when actuated, said severing means with respect to said support means, whereby said severing means enters and opens the envelope.

References Cited by the Examiner

UNITED STATES PATENTS

| | | | |
|---|---|---|---|
| 2,865,452 | 12/1958 | Porter | 83—613 |
| 2,866,505 | 12/1958 | Forkner | 83—613 |
| 2,979,979 | 4/1961 | Hearden | 83—407 |
| 2,995,362 | 8/1961 | Levy | 271—36 |
| 3,044,770 | 7/1962 | Breuers | 271—36 |
| 3,076,965 | 2/1963 | Simjian | 346—22 |
| 3,116,718 | 1/1964 | Krupotich et al. | 120—35 |
| 3,143,100 | 8/1964 | Krupotich | 120—35 |
| 3,153,964 | 10/1964 | Cordey | 83—407 |
| 3,204,503 | 9/1965 | Simjian | 83—912 X |

RICHARD B. WILKINSON, *Primary Examiner.*

J. L. SEITCHIK, J. W. HARTARY, *Assistant Examiners.*